S. SALTO.
PROJECTING DEVICE FOR BEAMS OF LIGHT.
APPLICATION FILED JAN. 19, 1920.
1,422,307.
Patented July 11, 1922.
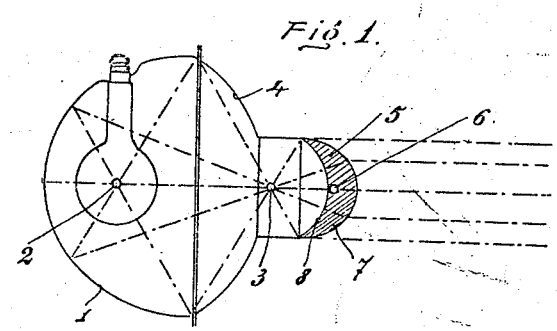
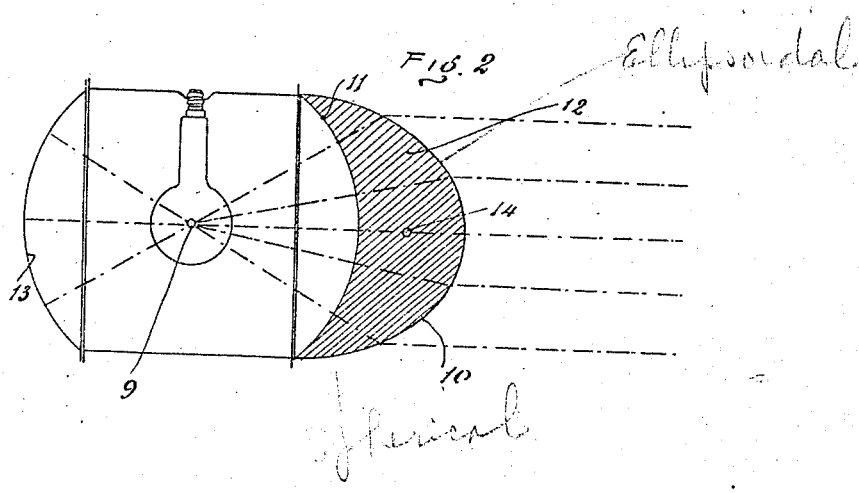
Inventor:
per Salvatore Salto
H. W. Plucker
Attorney.

UNITED STATES PATENT OFFICE.

SALVATORE SALTO, OF MILAN, ITALY.

PROJECTING DEVICE FOR BEAMS OF LIGHT.

1,422,307.  Specification of Letters Patent.  Patented July 11, 1922.

Application filed January 19, 1920. Serial No. 352,377.

*To all whom it may concern:*

Be it known that I, SALVATORE SALTO, a subject of the King of Italy, residing at Milan, in the Kingdom of Italy, have invented certain new and useful Improvements in Projecting Devices for Beams of Light, of which the following is a specification.

This invention relates to projectors for light rays and has for its object to provide a projector capable of utilizing a very large portion of the light rays emanating from a concentrated source and of sending out a pencil of parallel light rays which, according to the various purposes for which the apparatus is used, may be rendered larger or smaller in section independently of the size of the light source.

In the accompanying drawings which show two examples of apparatus according to the invention;

Fig. 1 represents the first apparatus diagrammatically; and

Fig. 2 shows the second or alternative construction.

Inside of a hollow ellipsoid 1 fitted with an internal reflecting surface is arranged the light source at the focus 2 of the ellipsoid. The other focus 3 of the ellipsoid is at the same time the focus of the outer elliptical surface of a lens 5. The lens 5 consists of a transparent body whose outer surface 7 is an ellipsoid of revolution having its foci at 3 and 6, whereas the inner lens surface is a spherical surface having its center at 3. The outer elliptical surface 7 is generated by the revolution of an ellipse about an axis passing through the ellipse foci 3 and 6. The ratio of the major axis of the ellipse to the distance between the ellipse foci is equal to the refraction index of the substance from which the lens is made. It is well known that, when a lens with elliptical curvature fulfils these conditions, all the light rays emanating from the focus 3 will be sent out in a parallel bundle.

The working of the apparatus is as follows:

The concentrated source of light is so arranged within the apparatus that the luminous centre coincides with the focus 2 of the reflecting ellipsoid 1. The rays impinging onto the elliptical surface 1 will, after reflection, converge at the other focus 3 of the reflecting ellipsoid. The focus 3, however, is at the same time the focus of the lens 5 and for this reason the rays will enter the lens through its inner spherical surface 8 without undergoing any refraction, but on reaching the outer elliptical surface 7 they will be subjected to a refraction that will cause them to leave the lens in a parallel pencil.

The reflecting surface 4 connecting the reflecting ellipsoid 1 and the refracting system is a spherical surface with its center at 2. In this way any rays impinging onto the surface 4 will be radially reflected back therefrom onto the elliptical reflecting surface 1 through its focus 2 and then from 1 will be reflected back again through 2 onto the focus 3. The spherical surface 4 accordingly works as an intermediate surface having for its object to recuperate the radiations from the light source that do not impinge onto the elliptical surface directly.

On examining the paths of the rays issuing from the concentrated source of light and impinging onto the reflecting surfaces it will be observed that all radiations starting from the focus 2 leave the apparatus in a parallel pencil. A further, most important advantage is that the pencil of rays issuing from the apparatus can be restricted in diameter at will, since it suffices to use a smaller or larger lens 5 to obtain a pencil of smaller or larger diameter independently from the size of the light source at 2. In this form the invention is very well adapted for cinematographic apparatus, in which the desired object is that of intensely illuminating the relatively small surface of the cinematographic film.

The pencil of rays issuing from the apparatus can be rendered convergent by means of an ordinary converging lens, or divergent by means of an ordinary diverging lens according to the purposes for which the apparatus is intended.

Whilst the eccentricity of the elliptical surface 7 of the lens 5, that is to say the ratio of the greater axis to the distance between the two foci of the generating ellipse is strictly determined by the refraction index of the refracting medium from which the lens is made, the eccentricity of the reflecting ellipsoid may be selected at will, the extreme case being when focus 2 is made to coincide with focus 3, that is to say when the ellipsoidal is altered to a spherical reflecting surface. An apparatus of this kind is illustrated in Fig. 2. Here 9 is the curvature center of the spherical reflecting surface 13 and is at the same time one of the foci of the ellipsoidal surface 10 of the lens 12, whose other focus is at 14. Also the inner spherical surface 11 of the lens 12 has its curvature center at 9, where the concentrated source of light is arranged. The rays emitted by the light source which, starting from 9, impinge onto the spherical mirror 13 are reflected back, pass through 9 again and thence to the ellipsoidal surface 10, where they are refracted in such a way as to form a pencil of parallel rays. The rays starting from 9 and impinging onto the spherical surface 11 of the lens 12 enter the latter without undergoing any refraction and in turn are rendered parallel on being refracted at the ellipsoidal lens surface 10.

This special construction has several advantages due to simplicity of manufacture, high utilization of the luminous source as well as to its optic effect at large distances. It may be used with advantage as searchlight for marine purposes and, in minor size, for automobiles.

Having now particularly described and ascertained the nature of my said invention and in what manner the same is to be performed, what I claim, and desire to secure by Letters Patent, is:—

1. A projector for light rays comprising a curved reflecting surface, a concentrated source of light located at a focus of said surface, and a lens having its outer surface of ellipsoidal form located with a focus of the ellipsoid coincident with a focus of the reflecting surface and its inner surface of spherical form and centre also coincident with said last mentioned focus.

2. A projector for light rays comprising a reflector with ellipsoidal reflecting surface, a concentrated source of light located at a focus of the ellipsoid, and a lens having its outer convex surface part of an ellipsoid of revolution, said lens being located with one of its foci coincident with the conjugate focus of the reflecting surface, and having a spherical inner surface with its center also coincident with said conjugate focus.

3. In a projector for light rays, a reflector with a curved reflecting surface and a lens having an outer ellipsoidal convex surface and an inner concave spherical surface; said reflector and lens being arranged with coincident foci.

4. In a projector for light rays, a reflector with a curved reflecting surface and a lens having an outer ellipsoidal convex surface and an inner concave spherical surface; said reflector and lens being arranged with coincident foci and the eccentricity of the ellipse of reference of the convex lens surface being a function of the index of refraction of the lens material.

Signed at Trieste this 19th day of December, 1919.

SIG. SALVATORE SALTO.

Witnesses:
MINOT BATTINOES,
A. GRORDANO.